United States Patent [19]
Chandler et al.

[11] Patent Number: 6,088,503
[45] Date of Patent: Jul. 11, 2000

[54] OPTICAL FIBER PRECISION HANDLING TOOL

[75] Inventors: William Keith Chandler, Woodsboro; Thomas R. Boyer, Odenton; Nadir Shah, Elkridge, all of Md.

[73] Assignee: Ciena Corporation, Linthicuim, Md.

[21] Appl. No.: 09/017,327

[22] Filed: Feb. 2, 1998

[51] Int. Cl.[7] .................................................. G02B 6/255
[52] U.S. Cl. ........................................... 385/135; 385/137
[58] Field of Search ..................................... 385/134–137, 385/95

[56] References Cited

U.S. PATENT DOCUMENTS

| | | | |
|---|---|---|---|
| 4,736,632 | 4/1988 | Case | 73/827 |
| 4,995,728 | 2/1991 | Finzel | 350/96.21 |
| 5,430,823 | 7/1995 | Dupont et al. | 385/135 |
| 5,453,653 | 9/1995 | Zumeris | 310/323 |

Primary Examiner—John D. Lee
Assistant Examiner—Michelle R. Connelly-Cushwa
Attorney, Agent, or Firm—Daniel N. Daisak; David L. Soltz

[57] ABSTRACT

A metrology frame for holding, transporting and aligning optical fibers while interconnecting optical fibers. The metrology frame includes an elongated rail and a pair of brackets slidably attached to the rail. The brackets are interconnected to a drive mechanism for moving the brackets along the rail. Attached to the brackets are aligning devices that orient and secure the optical fibers that are led from a fiber cassette. The metrology frame allows the optical fibers to be transferred through a series of optical fiber interconnection steps without having to re-secure or re-orient the fibers between the steps.

16 Claims, 5 Drawing Sheets

OPTICAL FIBER PRECISION HANDLING TOOL

BACKGROUND OF THE INVENTION

1. Field of the Invention

The present invention generally relates to an optical fiber precision handling tool, and more particularly, to a metrology frame that is used for facilitating the handling of optical fibers throughout the various process steps for interconnecting optical fibers, such as in a fusion process or in a connectorization process.

2. Description of the Related Art

Optical fibers are very light, very fragile, and have very small dimensions. During their initial manufacture, there are practical limitations on the lengths of optical fibers that can be drawn. Therefore, the connections between the fibers to create longer designated lengths of fiber are accomplished by splicing. In addition, optical fibers or optical devices must be connected to pieces of terminal equipment, such as optical transmitters and optical receivers, to create functioning optical systems.

Direct fiber-to-fiber splicing can be accomplished using mechanical splicing devices or by fusing the glass fiber ends together by means of a flame or electric arc. The nature of the fibers themselves, both in the material used in their fabrication and in the minute physical dimensions involved, as well as submicron alignment requirements, make fiber splicing more difficult than conventional metallic conductor splicing. Problems with efficient transfer of energy, minimized optical reflections, and mechanical integrity must be addressed when splicing optical fibers. The complexities of interconnecting the fibers demands careful attention to connector design and a high level of precision in fiber splices.

For example, present day optical fiber splicing operations require numerous steps, including stripping, cleaning, cleaving, aligning, splicing, recoating and pull-testing. While each of the individual steps can be performed somewhat quickly, the set-up, preparation and transfer time between the steps of the splicing process consumes a significant amount of time. For instance, the total time for the fusion splicing process is approximately one-half of the total for an optical transmission equipment manufacturing process.

Also, each of the steps are generally performed manually on a different apparatus or piece of manufacturing equipment. In addition, nearly all the set-up and preparation is performed manually, thereby increasing not only the amount of time for the process, but the possibility of human errors as well. Furthermore, human intervention also causes some deviation in splicing and connector uniformity across different technicians or different work groups.

Such time inefficiencies and lack of precise uniformity in performing the fusion and connectorization processes result in a reduced manufacturing output and a reduction in the quality of the fiber cable and optical systems.

Accordingly, there exists a need for an apparatus that can integrate and facilitate the handling of optical fibers during an optical fiber interconnection process, whether through a fusion process or a connectorization process, to reduce the amount of manual intervention by an operator during the process steps and thereby increase the quantity and uniformity of the fiber cable and optical devices manufactured through the interconnection process.

SUMMARY OF THE INVENTION

The present invention is therefore directed to an optical fiber precision handling tool, referred to hereinafter as a metrology frame, that substantially overcomes one or more of the problems due to the limitations and disadvantages of the conventional art.

In general, the present invention provides a metrology frame for holding, transporting and aligning fibers during an optical fiber interconnection process. The metrology frame includes an elongated rail and a pair of brackets slidably attached to the rail so that the brackets move relative to each other. The brackets are interconnected to a drive mechanism for moving the brackets along the rail. Aligning devices are attached to the brackets to orient and secure the optical fibers that are led from a fiber cassette. The fiber cassette is attached to a vertical support member extending from the rail.

The metrology frame allows the optical fibers to be transported through a series of process steps for interconnecting the optical fibers without having to resecure or re-orient the fibers between the steps. The metrology frame reduces the amount of manual intervention by an operator during the process steps, thereby increasing the quantity and uniformity of the fiber cable and optical devices manufactured by the interconnection process.

BRIEF DESCRIPTION OF THE DRAWINGS

The foregoing and other objects, aspects and advantages will be described with reference to the drawings, in which.

DETAILED DESCRIPTION OF THE PREFERRED EMBODIMENTS

While the present invention is described herein with reference to illustrative embodiments for particular applications, it should be understood that the present invention is not limited thereto. Those having ordinary skill in the art and access to the teachings provided herein will recognize additional modifications, applications, and embodiments within the scope thereof and additional fields in which the invention would be of significant utility without undue experimentation.

Figure 1:
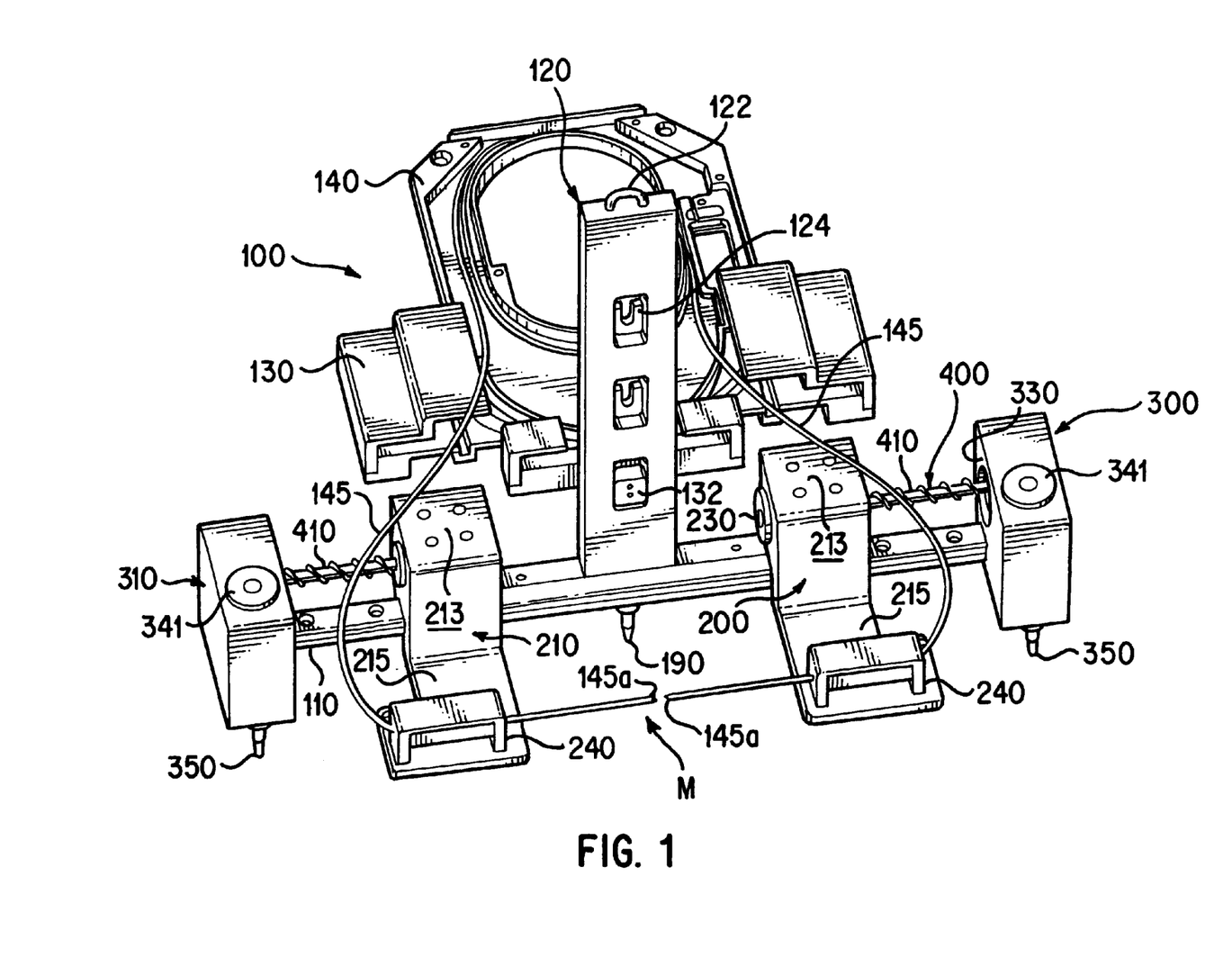
FIG. 1 is a perspective view of a metrology frame in accordance with an embodiment of the present invention.

FIG. 1 is a perspective view of one embodiment of a metrology frame 100 of the present invention that is used to align, integrate and automate certain portions of the optical fiber interconnection process, as well as facilitate handling of the optical fibers between steps of the process. To better understand the operation of the metrology frame 100, the general steps of an optical fiber fusion process are described below. While the description below refers to an exemplary fusion process, one of ordinary skill in the art would realize that the metrology frame described herein can be employed during any conventional fusion or connectorization process.

Briefly, by way of background, the optical fiber fusion process requires a number of steps as herein described. Note that most fibers are individually coated with one or two polymeric coatings, typically 65 to 185 μm in thickness, to preserve the intrinsic strength of the fiber and permit fiber handling. Accordingly, in a first stripping step, this protective coating must be removed, either mechanically, thermally, or by using a chemical solvent. Next, the stripped fiber ends are cleaned in an alcohol or other cleaning solution using an ultrasonic cleaner. Thereafter the fiber is cleaved by scribing the fiber with a diamond and carbide scribe to induce a break. The fiber ends then undergo the actual fusion splicing step. After the splicing step, a ultraviolet (UV) recoat step is performed to cover the exposed stripped and spliced portions of the fiber with a polymer for protection against the outside environment. Finally, a pull-test is performed on the fibers to test the strength of the splice, usually with at least a 150 Kpsi pull being applied to the fibers.

The ability to conduct such a fiber splicing process with a yield of 95%, including splicing of dissimilar fibers, represents a substantial challenge to optical device manufacturers. In an effort to achieve this yield goal and to sustain such a yield goal over an extended period of time, the metrology frame described herein has been developed. Each of the components of the metrology frame contribute to reducing the set-up, preparation and execution time of the optical fiber fusion operation.

Referring to FIG. 1, the metrology frame 100 is used to hold, transport and align the optical fibers to be connected, and the fiber cassettes from which the optical fibers extend, during an optical fiber interconnection process. The metrology frame 100 includes an elongated lateral rail 110 serving as the attachment point for the majority of the components of the frame. A vertical support member 120 extends from an upper surface of the rail 110. The vertical support member 120 contains an attachment or end effector device 122 to allow a robot or gantry system to pick-up and transport the entire metrology frame 100 between the various steps of the interconnect process. Since the frame 100 will be transported via the end effector 122, it is preferable to provide the vertical support 120 at a central location on the rail 110 to ensure the frame 100 is balanced during the transfer procedures.

The vertical support member 120 includes a plurality of vertically spaced attachment devices 124. A fiber cassette holder 130 includes a projection 132 that contacts and rests on the attachment device 124 to detachably attach the fiber cassette holder 130 to the vertical support member 120 in a substantially horizontal orientation with reference to the vertical support member 120. As shown in FIG. 1, the attachment device 124 comprises a projecting support bracket. Of course, one of ordinary skill in the art would understand that within the scope of the present invention, many different types of attachment devices may be used to detachably attach the fiber cassette holder 130 to the vertical support member 120. The attachment device chosen should provide a secure fit when the fiber cassette holder 130 and the vertical support member 120 are attached, but still provide the capability for easy insertion and removal.

Although the vertical support member 120 need only contain one attachment device 124, it is preferable to provide a plurality of attachment devices 124 so as to accommodate a plurality of fiber cassette holders 130. This allows several fiber cassettes 140 to be simultaneously attached to the metrology frame 100. The advantage of providing several fiber cassettes 140 on the metrology frame 100 is that splicing or connecting operations can be serially performed on the optical fibers 145 wound on each of the fiber cassettes 140. Also, in many cases, an optical fiber 145 from one fiber cassette 140 is spliced to an optical fiber 145 of another fiber cassette 140. By having two or more of the fiber cassettes 140 readily available and in the same place, the splicing or connecting operations can be executed more quickly.

Figure 2:
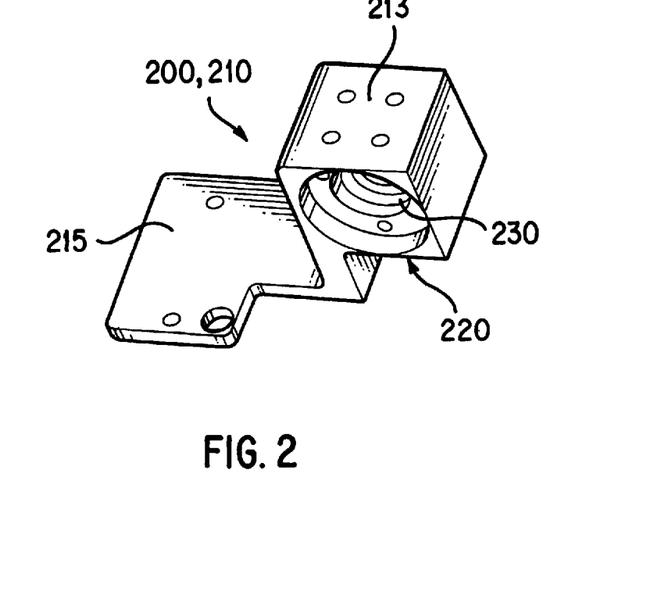
FIG. 2 is a side view of the bracket of FIG. 1.

A pair of aligning brackets 200 and 210 are provided on either side of the vertical support 120. As shown in FIG. 2, the aligning brackets 200, 210 have an L-shaped lower surface 220 that contacts the upper surface of the rail 110. The brackets 200, 210 are laterally movable or slidable along the rail 110 as described later in the specification. The vertical portion 213 of each of the brackets 200, 210 contains a threaded lateral via opening 230. The opening 230 is threaded to accommodate a lead screw 400 as described later. The flange portion 215 of each of the brackets 200, 210 includes an aligning device 240 (see FIG. 1) to align and secure the optical fibers during the interconnecting processes. As shown in FIG. 1, the optical fibers 145 from the fiber cassette 140 are passed through the aligning devices 240. Note that the aligning devices 240 in FIG. 1 are represented as cube-shaped devices for ease of illustration. However, it is understood that any number of conventional or custom aligning mechanisms may be incorporated into the metrology frame 100 of the present invention. Regardless of the aligning device or mechanism employed, it is important that the optical fiber ends 145a be movable toward and away from each other. As shown in FIG. 1 for example, after the optical fiber ends 145a are aligned by the aligning devices 240, they are in position to undergo the various steps of the fusion or connectorization process between the respective brackets 200, 210 in the area denoted by reference letter M.

Referring to FIG. 1 and FIGS. 3A to 3C, a frame leg 300 is attached to one end of the rail 110 and another frame leg 310 is attached to the other end of the rail 110. The frame legs 300, 310 not only provide stability to the rail 110 and the overall frame 100, in this embodiment they house a drive mechanism to move the aligning brackets 200, 210 along the rail 110.

The ability to move the brackets 200, 210 along the rail 110 provides a significant amount of flexibility in performing the fusion or connectorization process steps without ever having to remove the optical fibers 145 from the aligning devices 240 on the frame 100. This saves time and reduces the need to manually shift or transfer the optical fibers 145, which results in a quicker fusion or connectorization process with a greatly reduced susceptibility to human error or human variation. Although only one of the brackets 200, 210 needs to be movable relative to the other to provide the required lateral movement to facilitate the interconnecting operations, it is preferable to provide a drive mechanism to move both of the brackets 200, 210 and the discussion below is directed to such an embodiment. While the following discussion describes the operation of one of the drive mechanisms, it is understood that the description is equally applicable to the other drive mechanism.

Returning to FIG. 1 and FIGS. 3A to 3C, the drive mechanism for moving the aligning brackets includes a motor 320, shown in one embodiment disposed below a planar surface 515 on which the frame legs 300, 310 rest (FIG. 3A). A worm assembly 340 is housed within each of the frame legs. The worm assembly 340 has a shaft 325 extending from the bottom surface of the frame legs to contact the motor 320. The motor 320 operates to rotate the shaft 325 about its vertical axis. The upper part of the shaft is capped by a bearing 341. The worm assembly further includes a worm gear 342, the operation of which will be described further below.

Figure 3A:
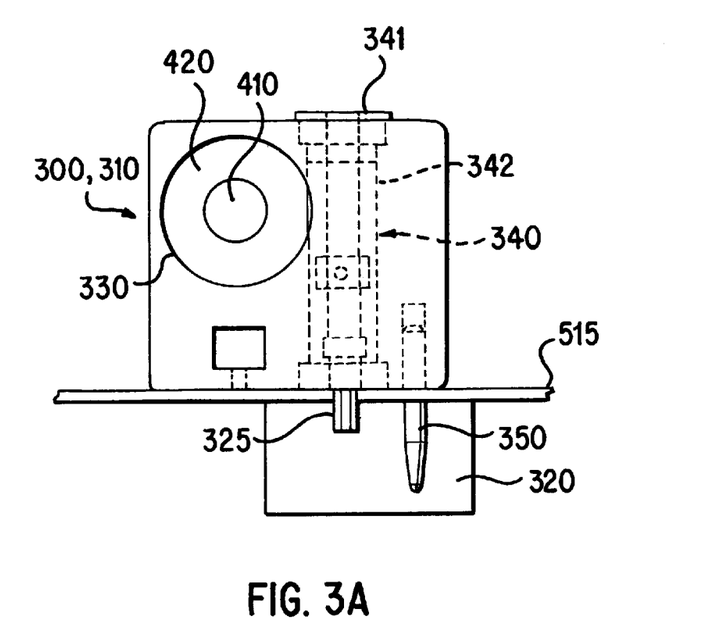
FIG. 3A, 3B and 3C are side, top perspective, and bottom perspective views, respectively, of one embodiment of a drive mechanism for the metrology frame.
Figures 3B, 3C:
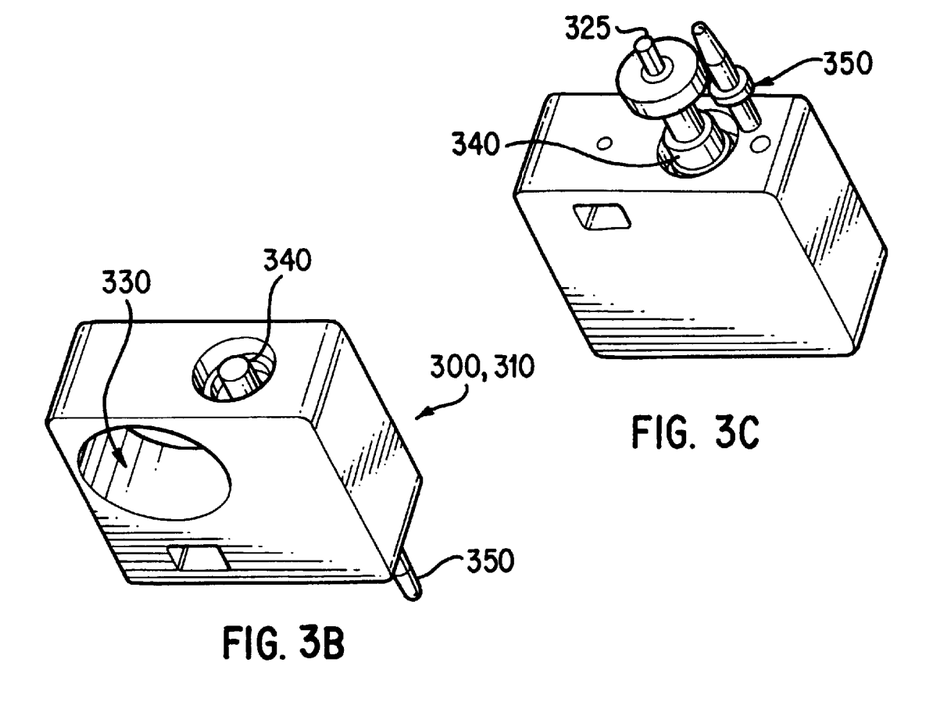
Figure 4:
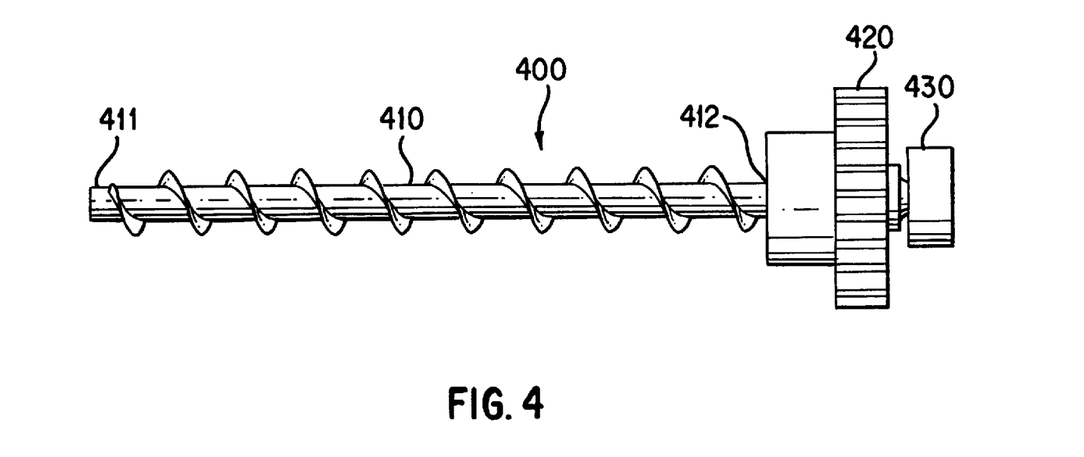
FIG. 4 is a side view of the lead screw assembly of FIG. 1.

As shown in FIG. 1 and FIG. 4, a lead screw assembly 400 has one end rotatably connected to the motor 320 through the worm assembly 340, and another end rotatably connected to the threaded opening 230 in the aligning bracket 200, 210. More specifically, one end 411 of the screw shaft 410 contacts the threads of the threaded opening 230 in the aligning brackets 200 or 210. The opposite end 412 of the screw shaft 410 is attached to a worm gear 420. The worm gear 420 of the screw assembly 400 fits into the recess 330 of the frame leg 300 or 310 as shown in FIG. 3A and FIG. 3B. The worm gear 420 of the screw assembly 400 intermeshes with the worm gear 342 of the worm assembly 340 disposed inside the frame legs 300 or 310. Reference numeral 430 denotes a radial thrust bearing.

In operation, the motor 320 rotates the shaft 325 of the worm assembly 340, which axially rotates the worm gear 342 as well. The axial rotation of the worm gear 342 is converted to lateral rotation of the screw assembly 400, that is, coincident with the direction of the rail 110, by the intermeshing of worm gear 342 and worm gear 420. The rotation of the screw shaft 410 causes the brackets 200 or 210 to move along the rail 110 as the end 411 of the screw shaft 410 intermeshes with the threaded opening 230. The motor 320 is operative to rotate the shaft 325 in either a clockwise or counter-clockwise manner, so that the brackets 200 or 210 can move either toward or away from each other in the vicinity of the working area M.

The frame 100 further includes a rail guide pin 190 centrally located along and protruding from a bottom surface of the rail 1 10 for guiding and/or stabilizing the frame. Also, frame leg guide pins 350 protrude from a bottom surface of each of the frame legs 300, 310 for guiding and/or stabilizing the frame legs and anchoring the motor 320. Alternately, the frame leg guiding pins 350 may be provided outside the motor 320 to anchor the frame legs to a planar surface.

Figure 5:
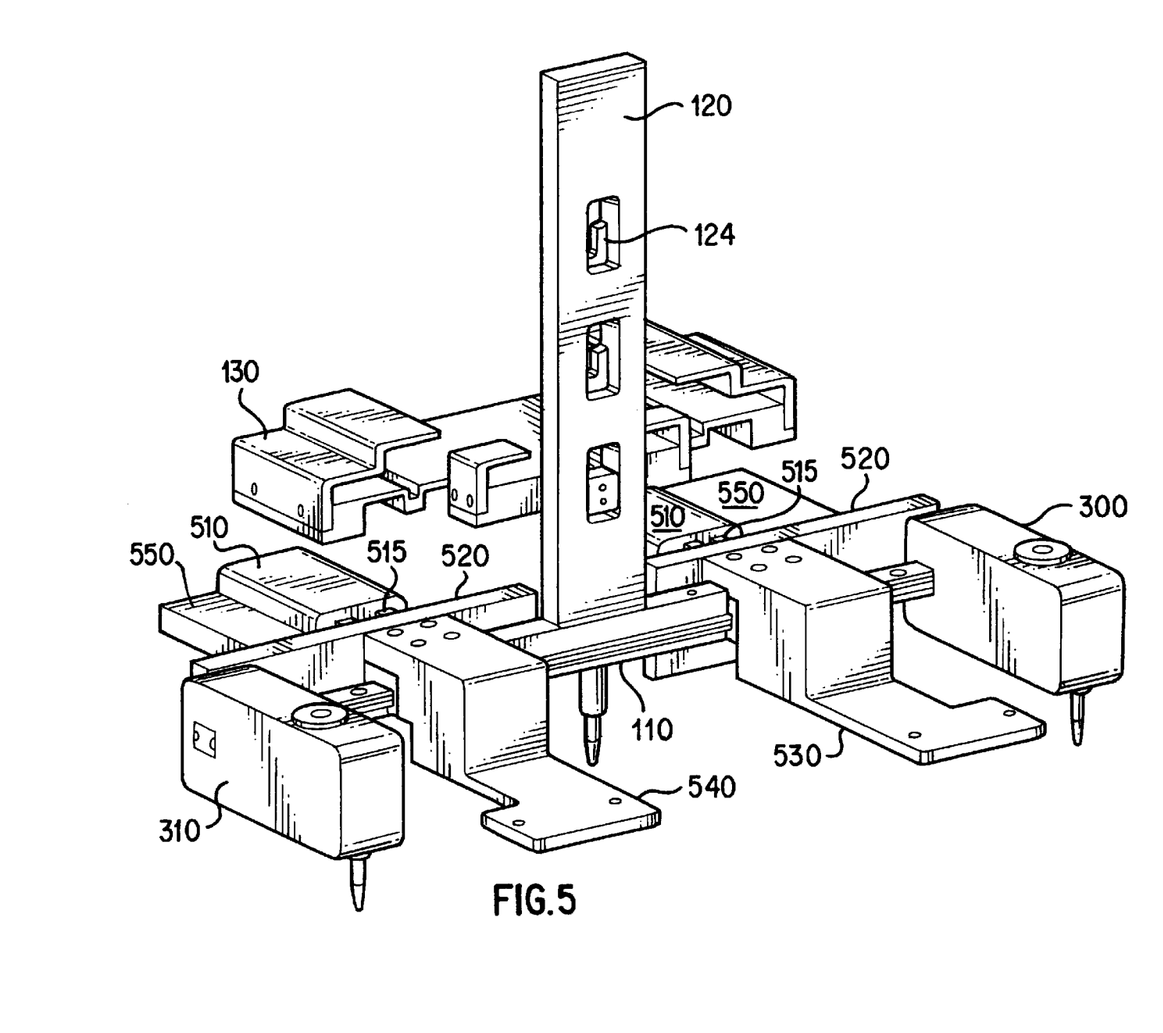
FIG. 5 is a perspective view of a metrology frame in accordance with a second embodiment of the present invention illustrating another drive mechanism.

FIG. 5 illustrates another preferred embodiment of the metrology frame 500 of the present invention in which the worm gear and motor mechanism of FIG. 1 is replaced by a commercially available piezoelectric motor, specifically a piezo ceramic linear motor. The same reference numerals in FIG. 5 illustrate the same or similar parts as described in FIG. 1.

In this embodiment, the piezo motor 510 actuates a plurality of ceramic fingers 515 extending from the piezo motor 510, which ceramic fingers 515 are pressed against a ceramic drive strip 520. The ceramic drive strip 520 is attached by a self-adhesive backing and epoxy to each of the slidable aligning brackets 530, 540. In general operation, application of a voltage to the piezo motor 510 causes the ceramic fingers 515 to oscillate or reciprocate in either a clockwise or counter-clockwise manner, depending on the polarity of the signal pulse. Since the piezo motor 510 is fixed relative to the metrology frame 500, the oscillating motion of the ceramic fingers 515 pressed against the ceramic drive strip 520 causes movement of the ceramic drive strip 520. Note that the movement of the ceramic drive strip 520 results in movement of the aligning brackets 530, 540 to which the ceramic drive strip 520 is attached. Movement of the aligning brackets 530, 540 toward or away from each other is achieved by changing the polarity of the signal pulse, which changes the oscillation direction of the ceramic fingers 515 pressed against the ceramic drive strip 520. Pulse amplitude dictates the velocity of the movement. The ultimate travel distance is governed by the length of the ceramic drive strip 520. This distance would be selected based on the predicted range of travel required by the aligning brackets 530, 540 to execute a fusion or connectorization process.

Reference numeral 550 represents a linear encoder 550 mounted to the piezo motor 510 for providing a feedback loop for the motor position for maximizing the high resolution achieved through the operation of the piezo motor. The piezo motor driven movement in this embodiment is more precise (nanometer resolution) than the worm gear assembly motor drive mechanism in the embodiment of FIG. 1. Another advantage of the piezo motor is the absence of an intrinsic magnetic field, making the motor immune to external magnetic fields.

Note that two radically different drive mechanisms have been illustrated. One of ordinary skill in the art would realize that any number of drive mechanisms can be used to move the aligning brackets relative to each other, whether powered or unpowered. What is important is that the drive mechanism provide precise controlled movement of the aligning brackets.

Figure 6:
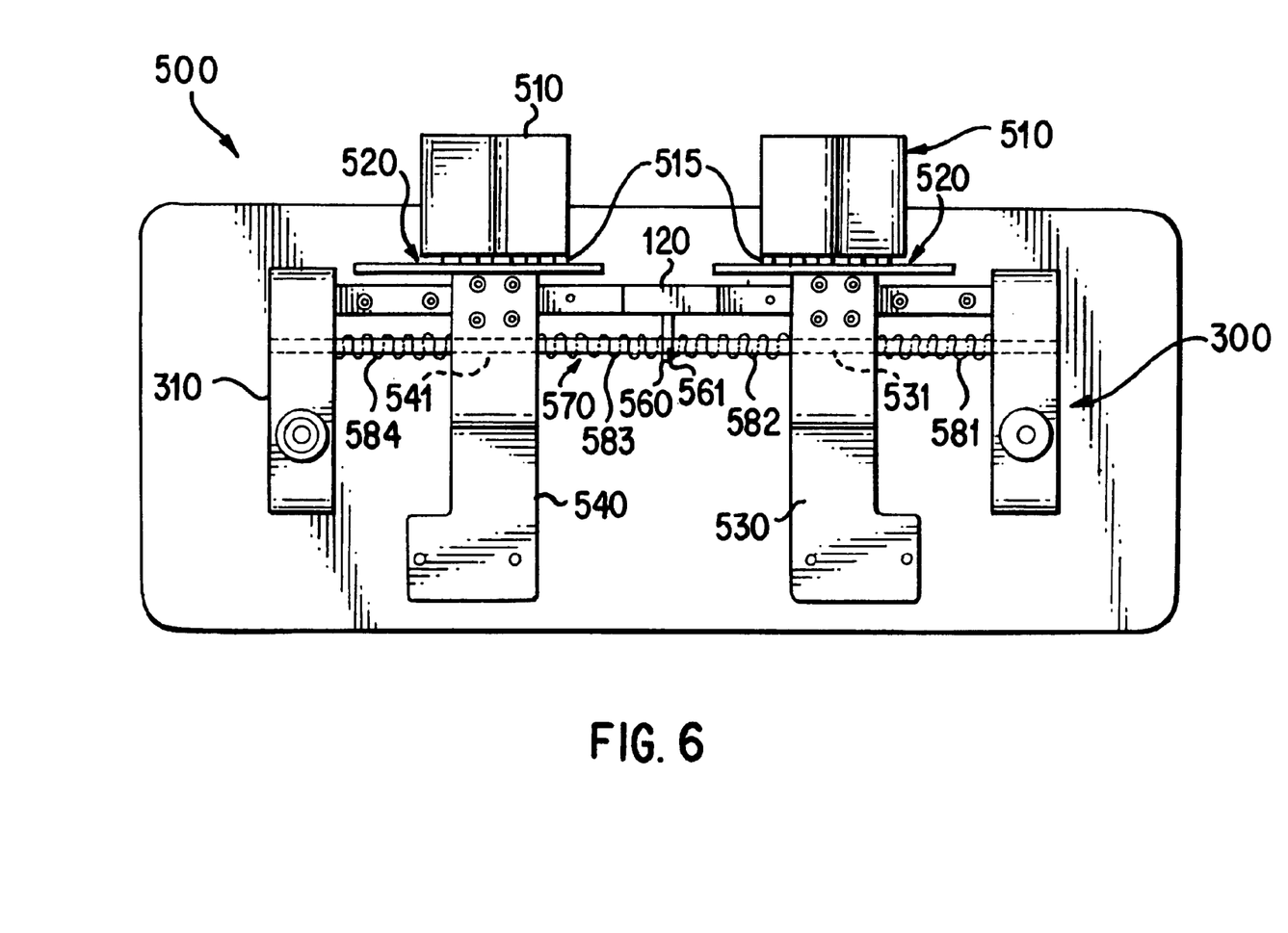
FIG. 6 is a top schematic view of the metrology frame of FIG. 5 which incorporates a guide rod for the aligning brackets.

FIG. 6 illustrates a top schematic view of the metrology frame 500 incorporating a center bracket 560 connected to the vertical support member 120 and extending between the aligning brackets 530, 540. A guide rod 570 is connected between the frame legs 300, 310 and passes through openings 531, 561, and 541 in respective of the aligning bracket 530, center bracket 560, and aligning bracket 540. The guide rod 570 provides lateral guidance for the slidable aligning brackets 530, 540.

In addition, a plurality of centering springs may be disposed along portions of the guide rod 570 for establishing a reference location for the aligning brackets by maintaining the relative position between the aligning brackets 530, 540 themselves, as well as between the respective aligning bracket 530 or 540 and the adjacent frame leg 300 or 310. Preferably, four centering springs 581, 582, 583 and 584 are provided, although less or more can be provided. Specifically, centering spring 581 is disposed along a portion of the guide rod 570 between frame leg 300 and aligning bracket 530; centering spring 582 is disposed along a portion of the guide rod 570 between aligning bracket 530 and center bracket 560; centering spring 583 is disposed along a portion of the guide rod 570 between center bracket 560 and aligning bracket 540; and centering spring 584 is disposed along a portion of the guide rod 570 between aligning bracket 540 and frame leg 310. Centering springs 582 and 583 may be replaced by a single spring, in which case the center bracket can be eliminated.

In addition to establishing a reference and maintaining the relative position between the aligning brackets, the location and/or elastic strength of the centering springs can be optimized for certain critical processes, such as to provide a desired degree of tension during the actual splicing step in an overall fusion process.

As described above, the metrology frame provides a versatile and stable mechanism to hold, transport and align the optical fibers during any interconnecting process, whether a fusion process or a connectorization process. In operation, the metrology frame would be manually or automatically positioned adjacent to or over a working area in order to execute the task. After the task is completed, the entire metrology frame would be moved to another location so that the next step in the fusion process or connectorization process can be executed. This sequential transfer of the frame among the work areas can be carried out with a minimum amount of human intervention and without having to remove and replace the optical fibers from one holding device to another.

Although preferred embodiments of the present invention have been described in detail herein above, it should be clearly understood that many variations and/or modifications of the basic inventive concepts herein taught, which may appear to those skilled in the art, will still fall within the spirit and scope of the present invention as defined in the appended claims and their equivalents.

What is claimed is:

1. A metrology frame for orienting optical fibers during an optical fiber interconnect process, said frame comprising:

an elongated lateral rail;

a first aligning bracket and a second aligning bracket slidably connected to said rail;

a drive mechanism contacting said first aligning bracket and said second aligning bracket for sliding said first aligning bracket and said second aligning bracket along said rail;

a pair of optical fiber aligning devices, each connected to respective of said first aligning bracket and said second aligning bracket;

a first frame leg attached to one end of said rail and a second frame leg attached to another end of said rail;

a vertical support member extending from an upper surface of said rail; and a fiber cassette holder horizontally attached to said vertical support member, said drive mechanism comprising:

a pair of motor assemblies, each attached to respective of said first frame leg and said second frame leg; and a pair of lead screw assemblies, each having one end rotatably connected to a corresponding motor assembly and another end rotatably connected to a threaded opening in respective of said first aligning bracket and second aligning bracket.

2. The metrology frame of claim 1, wherein each of said first frame leg and second frame leg comprises a worm assembly vertically disposed therein, each worm assembly converting axial rotation from said motor to lateral rotation of respective of said lead screw assemblies to thereby slide each of said first aligning bracket and said second aligning bracket along said rail as said lead screw assemblies rotate relative to said threaded openings in said aligning brackets.

3. The metrology frame of claim 1, wherein said vertical support member includes a bracket for contacting a projection of said fiber cassette holder for detachably attaching said vertical support member and said fiber cassette holder.

4. The metrology frame of claim 3, wherein said vertical support member includes a plurality of vertically spaced brackets for detachably attaching a corresponding plurality of fiber cassette holders.

5. The metrology frame of claim 4, wherein said vertical support member extends from a central region of said rail.

6. The metrology frame of claim 1, wherein each of said first aligning bracket and said second aligning bracket are slidable toward and away from each other.

7. A metrology frame for orienting optical fibers during an optical fiber interconnect process, said frame comprising:

an elongated lateral rail;

a first aligning bracket and a second aligning bracket slidably connected to said rail;

a drive mechanism contacting said first aligning bracket and said second aligning bracket for sliding said first aligning bracket and said second aligning bracket along said rail;

a pair of optical fiber aligning devices, each connected to respective of said first aligning bracket and said second aligning bracket;

a first frame leg attached to one end of said rail and a second frame leg attached to another end of said rail;

a vertical support member extending from an upper surface of said rail; and a fiber cassette holder horizontally attached to said vertical support member, said drive mechanism comprising:

a ceramic drive strip attached to each of said first aligning bracket and said second aligning bracket; and a pair of piezoelectric motors, each motor having ceramic fingers extending therefrom which contact said ceramic drive strip.

8. The metrology frame of claim 7, wherein said piezoelectric motors are fixed relative to said metrology frame, and application of a voltage to said piezoelectric motor causes oscillating movement of said ceramic fingers pressed against said ceramic drive strip, thereby causing movement of said ceramic drive strip relative to said piezoelectric motor and corresponding movement of each of said first aligning bracket and said second aligning bracket.

9. The metrology frame of claim 8, said drive mechanism further comprising a center bracket connected to said vertical support member and extending between said first aligning bracket and said second aligning bracket, a rod connected between said first frame leg and said second frame leg and passing through respective openings in each of said first aligning bracket, said second aligning bracket, and said center bracket, and a plurality of springs disposed along portions of said rod for maintaining a relative position between said first aligning bracket, said second aligning bracket, said first frame leg and said second frame leg.

10. The metrology frame of claim 9, wherein said plurality of springs comprises four springs, and wherein a first spring is disposed along a portion of said rod between said first frame leg and said first aligning bracket, a second spring is disposed along a portion of said rod between said first aligning bracket and said center bracket, a third spring is disposed along a portion of said rod between said center bracket and said second aligning bracket, and a fourth spring is disposed along a portion of said rod between said second aligning bracket and said second frame leg.

11. A metrology frame for orienting optical fibers during an optical fiber interconnect process, said frame comprising:

an elongated lateral rail;

a first aligning bracket and a second aligning bracket slidably connected to said rail;

a drive mechanism contacting said first aligning bracket and said second aligning bracket for sliding said first aligning bracket and said second aligning bracket along said rail;

a pair of optical fiber aligning devices, each connected to respective of said first aligning bracket and said second aligning bracket;

a first frame leg attached to one end of said rail and a second frame leg attached to another end of said rail;

a vertical support member extending from an upper surface of said rail; and a fiber cassette holder horizontally attached to said vertical support member, said vertical support member comprising:

a bracket for contacting a projection of said fiber cassette holder for detachably attaching said vertical support member and said fiber cassette holder;

a plurality of vertically spaced brackets for detachably attaching a corresponding plurality of fiber cassette holders, said vertical support member extending from a central region of said rail; and an end effector attached to an upper distal end.

12. A metrology frame for orienting optical fibers during an optical fiber interconnect process, said frame comprising:

an elongated lateral rail;

a first aligning bracket and a second aligning bracket slidably connected to said rail;

a drive mechanism contacting said first aligning bracket and said second aligning bracket for sliding said first aligning bracket and said second aligning bracket along said rail;

a pair of optical fiber aligning devices, each connected to respective of said first aligning bracket and said second aligning bracket;

a first frame leg attached to one end of said rail and a second frame leg attached to another end of said rail;

a vertical support member extending from an upper surface of said rail; and a fiber cassette holder horizontally attached to said vertical support member, said vertical support member comprising:

a bracket for contacting a projection of said fiber cassette holder for detachably attaching said vertical support member and said fiber cassette holder, said fiber cassette holder being detachably attached to a surface of said vertical support member opposite to a surface of said vertical support member facing said aligning devices.

13. The metrology frame of claim 12, wherein each aligning device contains a lateral optical fiber via opening.

14. The metrology frame of claim 13, wherein an optical fiber from a fiber cassette disposed in said fiber cassette holder is passed through said aligning device via opening in each said aligning device.

15. A metrology frame for orienting optical fibers during an optical fiber interconnect process, said frame comprising:

an elongated lateral rail;

a first aligning bracket and a second aligning bracket slidably connected to said rail;

a drive mechanism contacting said first aligning bracket and said second aligning bracket for sliding said first aligning bracket and said second aligning bracket along said rail;

a pair of optical fiber aligning devices, each connected to respective of said first aligning bracket and said second aligning bracket;

a first frame leg attached to one end of said rail and a second frame leg attached to another end of said rail;

a vertical support member extending from an upper surface of said rail;

a fiber cassette holder horizontally attached to said vertical support member; and a rail guide pin centrally located along and protruding from a bottom surface of said rail.

16. The metrology frame of claim 15, further comprising a frame leg guide pin protruding from a bottom surface of each of said first frame leg and said second frame leg.

* * * * *